US008881789B2

(12) United States Patent
Zeo et al.

(10) Patent No.: US 8,881,789 B2
(45) Date of Patent: Nov. 11, 2014

(54) ROLLER ASSEMBLY FOR A MOTOR VEHICLE

(75) Inventors: Gwenole Zeo, Ruit (DE); Guenther Renz, Ditzingen (DE)

(73) Assignee: Bos GmbH & Co. KG, Ostfildern (DE)

( * ) Notice: Subject to any disclaimer, the term of this patent is extended or adjusted under 35 U.S.C. 154(b) by 143 days.

(21) Appl. No.: 13/439,116

(22) Filed: Apr. 4, 2012

(65) Prior Publication Data

US 2012/0255690 A1  Oct. 11, 2012

(30) Foreign Application Priority Data

Apr. 7, 2011 (DE) .......................... 10 2011 007 004

(51) Int. Cl.
*B60J 1/20* (2006.01)
*B60J 7/00* (2006.01)

(52) U.S. Cl.
CPC ..................................... *B60J 7/0015* (2013.01)
USPC .................... 160/370.22; 160/273.1; 160/372; 296/214

(58) Field of Classification Search
USPC ......... 160/120, 370.22, 270, 271, 272, 268.1; 296/97.4, 97.8, 214, 143, 141, 215, 296/216.08
See application file for complete search history.

(56) References Cited

U.S. PATENT DOCUMENTS

| | | | | |
|---|---|---|---|---|
| 4,272,122 A | * | 6/1981 | Schatzler et al. | 296/221 |
| 4,844,532 A | * | 7/1989 | Ono et al. | 296/213 |
| 5,147,107 A | * | 9/1992 | Yamauchi et al. | 296/214 |
| 5,551,744 A | * | 9/1996 | Liao | 296/97.4 |
| 5,746,469 A | * | 5/1998 | Nonaka | 296/97.7 |
| 6,015,184 A | * | 1/2000 | Ewing et al. | 296/219 |
| 6,082,812 A | * | 7/2000 | Lenkens et al. | 296/214 |
| 6,520,239 B2 | | 2/2003 | Schlecht et al. | |
| 6,547,307 B2 | * | 4/2003 | Schlecht et al. | 296/97.4 |

(Continued)

FOREIGN PATENT DOCUMENTS

| | | |
|---|---|---|
| DE | 100 57 763 A1 | 6/2002 |
| DE | 102 53 816 B3 | 2/2004 |

(Continued)

OTHER PUBLICATIONS

Office Action of German Patent Office issued in Application No. 10 2011 007 004.4 mailed Feb. 28, 2012 (8 pages).

(Continued)

*Primary Examiner* — Katherine Mitchell
*Assistant Examiner* — Johnnie A Shablack
(74) *Attorney, Agent, or Firm* — Flynn, Thiel, Boutell & Tanis, P.C.

(57) ABSTRACT

A roller assembly for a motor vehicle having a winding shaft, a flexible fabric sheet which when in a stowed condition is wound onto the winding shaft and which can be unwound from the winding shaft in a longitudinal direction in order to reach a functioning position and which has sliding elements on its side edges, two guide rails extending in the longitudinal direction to guide the sliding elements, and a frame, whereby the guide rails are fastened on the frame so that they can be permanently fixed with a desired spacing. A rigid guide tube for a drive chain guided within the guide tube runs from the frame to the guide rail or to a feed-in piece mounted thereon, and a first fixing device is provided to fix the guide tube in a fixed location with respect to the frame in variable positions in the transverse direction.

15 Claims, 6 Drawing Sheets

(56) References Cited

U.S. PATENT DOCUMENTS

| | | | |
|---|---|---|---|
| 6,695,381 B2* | 2/2004 | Schlecht et al. | 296/97.4 |
| 6,739,375 B2* | 5/2004 | Schlecht et al. | 160/370.22 |
| 6,899,380 B2 | 5/2005 | Kralik et al. | |
| 6,910,518 B2* | 6/2005 | Zimmermann et al. | 160/370.22 |
| 7,059,651 B2* | 6/2006 | Bohm et al. | 296/97.11 |
| 7,314,079 B2* | 1/2008 | Yano et al. | 160/370.22 |
| 7,364,215 B2* | 4/2008 | Kim | 296/97.4 |
| 7,396,067 B2* | 7/2008 | Thumm et al. | 296/143 |
| 7,438,353 B2* | 10/2008 | Tsukamoto et al. | 296/214 |
| 7,455,345 B1* | 11/2008 | Kim | 296/97.4 |
| 7,503,374 B2* | 3/2009 | Takeuchi et al. | 160/370.22 |
| 7,717,157 B2* | 5/2010 | Miyachi et al. | 160/370.22 |
| 7,798,567 B2* | 9/2010 | Glasl et al. | 296/214 |
| 7,828,040 B2* | 11/2010 | Miyachi et al. | 160/370.22 |
| 7,857,035 B2* | 12/2010 | Miyachi et al. | 160/370.22 |
| 8,118,357 B2* | 2/2012 | Hotta et al. | 296/216.08 |
| 8,231,170 B2* | 7/2012 | Katayama et al. | 296/216.08 |
| 8,292,358 B2* | 10/2012 | Nakamura et al. | 296/214 |
| 8,397,788 B2* | 3/2013 | Weinbrenner et al. | 160/370.22 |
| 8,449,025 B2* | 5/2013 | Boersma et al. | 296/213 |
| 2002/0059986 A1 | 5/2002 | Schlecht et al. | |
| 2005/0046242 A1* | 3/2005 | De Gaillard et al. | 296/216.08 |
| 2005/0236872 A1* | 10/2005 | Raaf | 296/214 |
| 2007/0000625 A1 | 1/2007 | Buhl et al. | |
| 2007/0007783 A1* | 1/2007 | Schlecht | 296/24.4 |
| 2007/0210620 A1* | 9/2007 | Heidan | 296/214 |
| 2008/0035284 A1* | 2/2008 | Miyachi et al. | 160/370.22 |
| 2011/0187159 A1* | 8/2011 | Katayama et al. | 296/214 |
| 2012/0048489 A1* | 3/2012 | Oh et al. | 160/370.22 |
| 2012/0152472 A1* | 6/2012 | Walter | 160/370.22 |
| 2012/0193044 A1* | 8/2012 | Ojima | 160/370.22 |
| 2013/0049409 A1* | 2/2013 | Stark et al. | 296/219 |
| 2013/0168034 A1* | 7/2013 | Katada | 160/370.22 |

FOREIGN PATENT DOCUMENTS

| | | |
|---|---|---|
| DE | 10 2005 038 373 A1 | 2/2007 |
| DE | 10 2006 003 983 A1 | 8/2007 |
| DE | 20 2007 012 981 U1 | 3/2009 |
| DE | 10 2008 035 514 A1 | 2/2010 |
| EP | 1 738 942 A2 | 1/2007 |
| EP | 1 782 985 A1 | 5/2007 |

OTHER PUBLICATIONS

Search report issued in European Patent Office for EP 12 16 3112 dated Jul. 3, 2012 with English translation of categories of cited documents (7 pages).

* cited by examiner

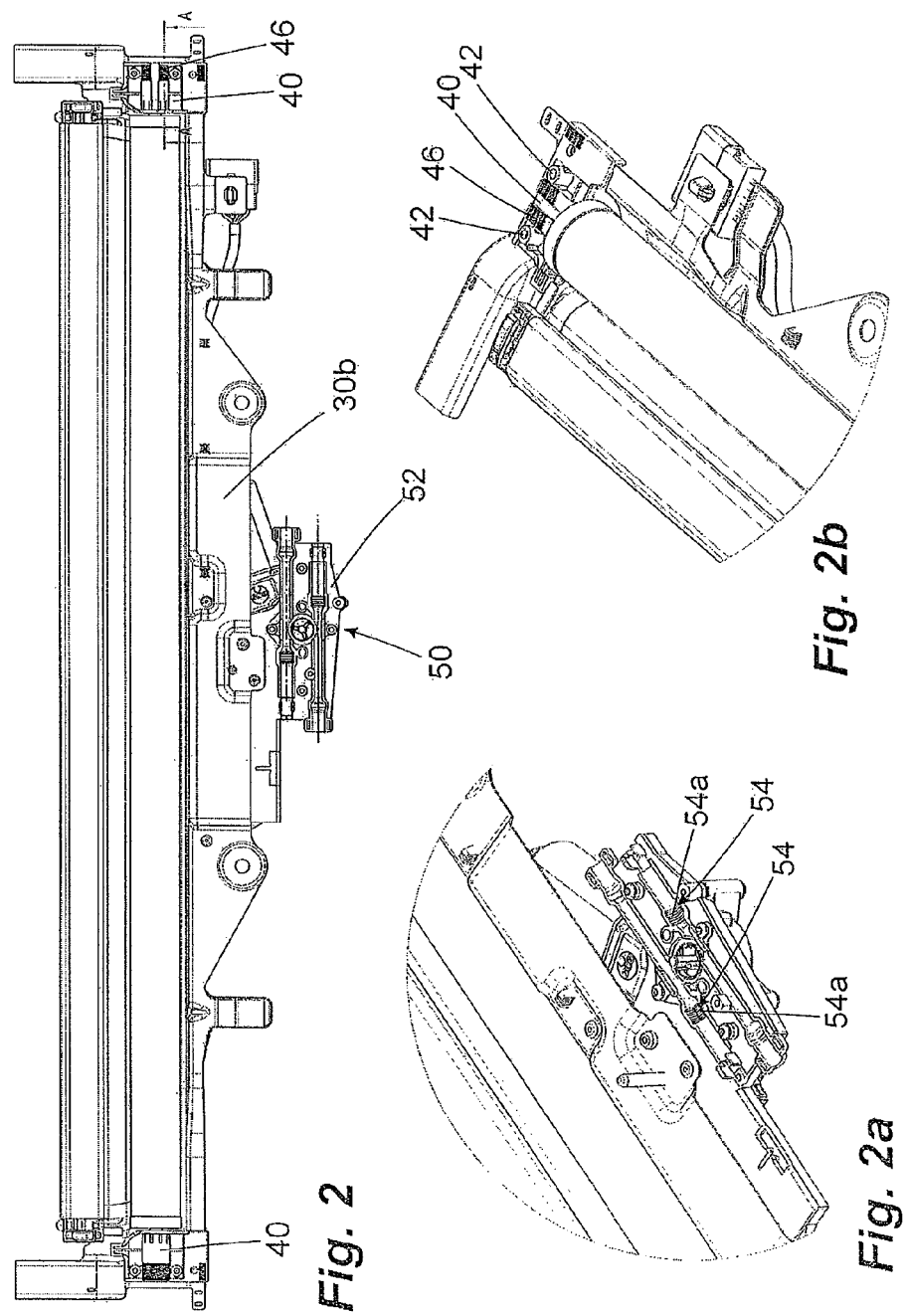

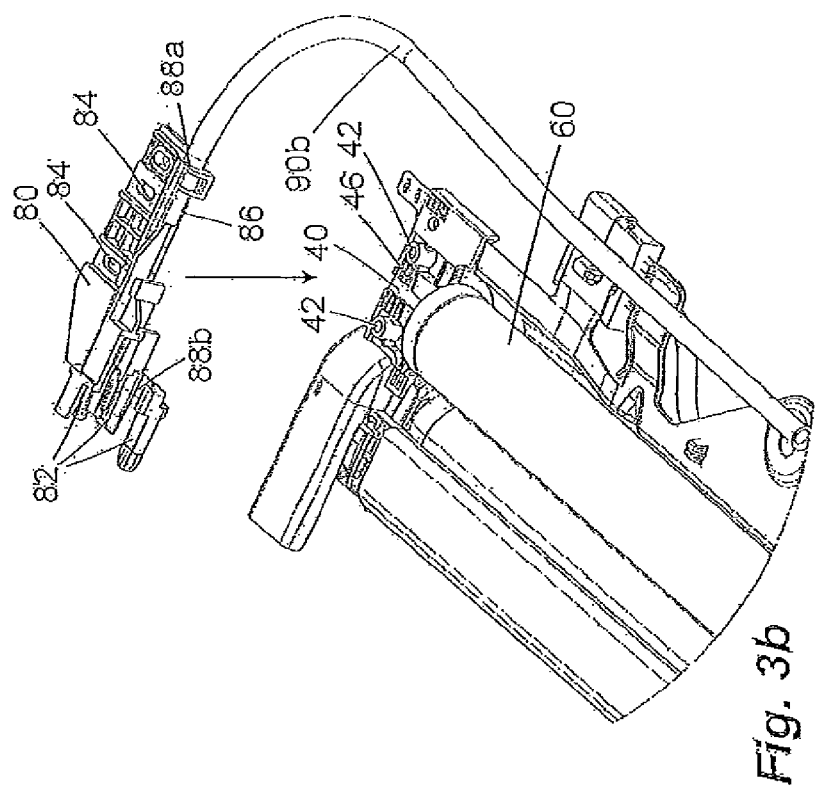
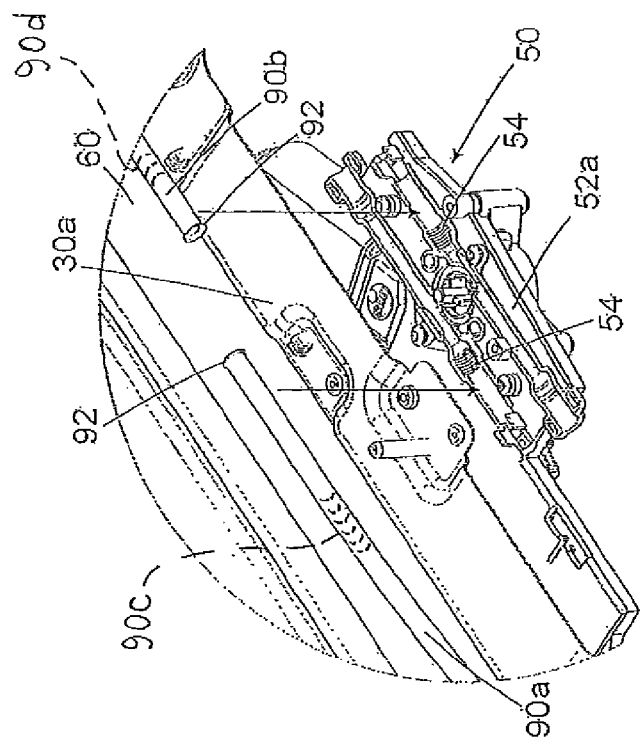
Fig. 3a
Fig. 3b

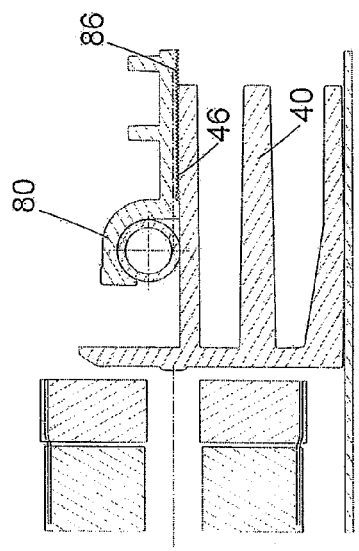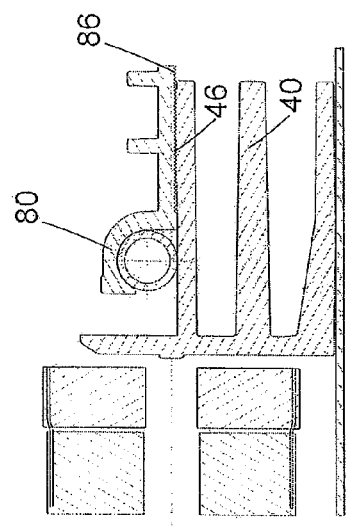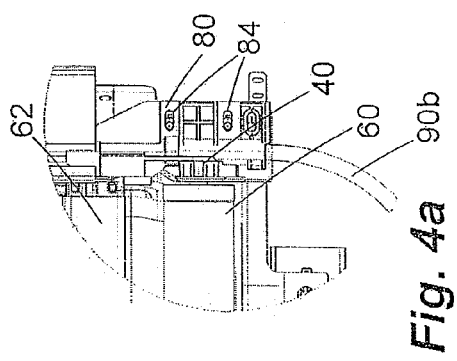
Fig. 4a
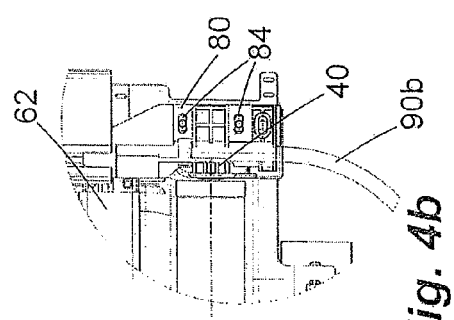
Fig. 4b

ROLLER ASSEMBLY FOR A MOTOR VEHICLE

CROSS REFERENCE TO RELATED APPLICATION

This application claims the priority of German Application No. 10 2011 007 004.4, filed Apr. 7, 2011, the disclosure of which is hereby incorporated by reference in its entirety into this application.

FIELD AND BACKGROUND OF THE INVENTION

The invention relates to a roller assembly for a motor vehicle having a rotatably supported winding shaft, a flexible fabric sheet which when in a stowed condition is wound onto the winding shaft and which can be unwound in a longitudinal direction in order to reach a functioning position and which has sliding elements on its side edges, two guide rails extending in the longitudinal direction to guide the sliding elements that are attached to the side edges of the fabric sheet, and a frame. The guide rails are here constructed such that they can be fastened with variable transverse distance on the frame so that a desired distance can be permanently fixed through this fastening.

Roller assemblies are used for a variety of purposes in motor vehicles. In particular they may be implemented as covers for freight compartments, as partition nets or as roller shades. The said roller shades can here be used both at essentially vertically aligned window surfaces and on essentially horizontal window surfaces, roof windows in particular.

Not exclusively, yet nevertheless particularly in connection with the said roof windows, it is of great importance that the fabric sheet does not sag to an unacceptable degree when in its functioning position. Since the material properties of the fabric sheet are not always entirely uniform, this must nevertheless be feared if the guide rails that guide the fabric sheet at the sides are mounted at a fixed distance from one another and are therefore separated by the same distance on all roller assemblies of the same type.

Generic roller assemblies counter this by having two guide rails that can be attached to the frame with a variable spacing. In this way it is possible, when the material properties or the cut sizes of the fabric sheet differ by small amounts, for an adjusted spacing of the guide rails nevertheless to ensure an at least substantially consistent sag of the fabric sheet, of a small and acceptable degree, for roller assemblies of the same design. This adjustment is carried out in the course of assembly, usually before the roller assembly is delivered to the vehicle manufacturer.

Electric motors are usually used with the roller assemblies that are fitted into motor vehicles, in order to move the fabric sheet between its stowed position and its functioning position. In order to transfer the force from the usually single electric motor that applies force to both sides of the fabric sheet, a drive chain designed to transmit both tensile and compressive forces, and held in a guide tube between the drive unit and the particular guide rail, may be used. It has nevertheless been found that ensuring the proper function of a generic roller assembly with such drive chains and guide tubes is problematic if the guide rails can have a variable spacing in the transverse direction. It has also been found that feed-in pieces attached to the guide rails for the sliding elements of the fabric sheet, or indeed for the drive chain, and which, due to the variable spacing between the guide rails, are only attached to these guide rails and not directly to the frame, move with respect to the associated guide rail in spite of being attached to them as a result of the force exerted by the drive chain, and can then cause the roller assembly to malfunction.

SUMMARY OF THE INVENTION

The object of the invention is to further develop a generic roller assembly in such a way that it features high reliability at the same time as providing for the easiest possible assembly.

According to the invention, this is achieved according to a first aspect of the invention in that a rigid guide tube for a drive chain that is guided within it runs from the frame to the guide rail or to a guide piece mounted in a fixed location on the guide rail, and that a first fixing device is provided by means of which it is possible to fix the frame end of the guide tube in a fixed location with respect to the frame in variable positions relative to the transverse direction.

In a design according to the invention therefore a guide tube in which a drive chain is carried extends from the frame to at least one of the guide rails with variable transverse spacing, whereby the special feature lies in the way this guide tube is attached to the frame. The concept of the drive chain is not to be understood as restricted to the purpose of a drive driven by a motor. Chains whose purpose is to synchronise the movement of the two sides of an extension rod are also understood as drive chains in the sense of the invention.

In the sense of the invention, the frame is considered to comprise all those components of the roller assembly that remain in a fixed location with respect to one another regardless of the spacing between the guide rails, and in particular a drive unit or synchronisation unit in the frame. The guide rails are attached to the frame with variable transverse spacing. In the simplest case, the frame consists of a simple cross-member that links together the two guide rails and thus fixes the spacing between them.

Because of the variable relative positioning of the guide rails to the frame, an invariable relative position of the frame end of the guide tube at the frame is disadvantageous. For this reason the fixing device that is provided according to the invention and that ensures the fixed position of the guide tube with respect to the frame is designed so as to ensure this fixed relative location in variable, selectable positions. The transverse spacing, which may vary between two roller assemblies of the same type, between the guide rail on the one hand and the fixing device, in particular a drive unit, provided at the frame side on the other hand, is compensated for in that the tube can be attached to the frame in not just one permanently specified position. It is therefore also no longer necessary to provide a number of different guide tube types, used according to the relative position of the particular guide rail with respect to the frame. The first fixing device is favourably designed in such a way that it permits a variable relative positioning of the guide tube with respect to the frame in the transverse direction of favourably at least 3 mm, particularly favourably of at least 6 mm.

The first fixing device is favourably provided on a drive unit that is provided on the frame. This is designed for translative movement of the drive chain, which extends from the drive unit into one of the guide rails, and by means of which the fabric sheet can be moved from the stowed position into the functioning position. This drive unit is implemented as part of the frame in a defined position with respect to the other frame components. The spacing between the drive unit and at least one of the guide rails is variable, depending on the spacing between the guide rails. The drive unit that is provided on the frame is favourably implemented for the application of force to at least one side edge of the fabric sheet by means of the drive chain, favourably however for the application of force to both sides of the fabric sheet.

Instead of a drive unit, the provision of a synchronisation unit that synchronises two drive chains that are held in two guide tubes extending from the two guide rails to the synchronisation unit may also be considered. This is particularly helpful on manually operated rollers in order to avoid misalignment.

The attachment of the guide tube at the frame end, in particular to the drive unit, can be continuously variable, for instance by having the guide tube held at the frame end by a pressed connection. Continuous adjustability can, for instance, also be created by means of a screwed connection with counter screw.

Nevertheless it is considered advantageous if the first fixing device is implemented in such a way as to fix the guide tube in a number of discrete positions. Favourably these discrete positions are separated from one another by less than 2 mm. The implementation with discrete positions for fixing the guide tube to the frame, in particular to the drive unit, has in practice been found adequate for proper function of the roller assembly, and can be realised in a particularly favourable manner in terms of an easy assembly procedure.

A simple design of this sort can, for instance, be achieved in that an end of the guide tube at the frame has a modification to its cross-section, in particular in the form of a widened region of the cross-section, whereby a tube receptacle for the guide tube is provided at the frame having a plurality of sections spaced apart from one another in the transverse direction of the roller assembly, with a shape matched to the modified cross-section of the guide tube in order to fix the guide tube in the region of the modified cross-section. In this way, form-locking is created with respect to the transverse direction, countering an undesirable displacement of the guide tube with respect to the frame. Such form-locking is of particularly great advantage bearing in mind that the relative position must be retained for years. The design in which the guide tube has a modification to its cross-section and is attached by engaging with one of a number of sections matched to it on the frame, in particular on a housing of the drive unit, is particularly easy to assemble. A design in which a number of modifications to the cross-section, neckings in particular, are given to the guide tube, which can be brought to engage with one or more matching lugs on the frame is considered disadvantageous in comparison with the design described above, although nevertheless possible. Variable positioning in combination with easy assembly can also be achieved in this way.

In terms of assembly, it is furthermore advantageous if the said tube receptacle comprises two half-shells to accept the frame end of the guide tube, whereby the half-shells fully surround the guide tube when assembled, and whereby the section or sections whose shapes are matched to the modified cross-section of the guide tube are fabricated on one or both of the two half-shells. It is particularly advantageous here if the half-shells or the parts of the housing on which the half-shells are fabricated, incorporate a means of connection in order to establish a snap-in connection.

The design using half-shells permits very easy assembly. The guide tube is placed in a half-shell that is in the desired relative position matched to the specific roller assembly, in particular favourably in a half-shell that is shaped to correspond to the modified cross-section of the guide tube, after which the second half-shell is attached, so that the guide tube is fully surrounded by the half-shells and is therefore no longer able to slip, orthogonally to the transverse direction, from the matched shaping of at least one of the half-shells. It is then permanently secured. In order to arrange for this assembly step to be as simple as possible, the half-shells are favourably joined by the said snap-in connection, so that they can no longer easily be separated.

According to a further aspect of the invention a feed-in piece implemented as a separate component is associated with each of the guide rails, whereby the feed-in pieces each incorporate a feed-in opening for the sliding elements and/or a feed-in opening for the associated drive chain. The feed-in pieces are here connected to the guide rails in such a way that together with the guide rails they adopt a variable transverse distance from one another. Furthermore according to the invention cooperating second means of fixing are provided at both the feed-in piece and at the frame, permitting fixing of the feed-in piece in a variable position on the frame, and thereby securing the feed-in pieces to prevent them from twisting with respect to the frame.

According to this second aspect of the invention, which favourably is implemented in combination with the first aspect explained above, feed-in pieces are provided on both guide rails having a variable spacing between them together with the guide rails, in order to ensure a uniform appearance of the fabric sheet when in its functioning position. It has, however, been found that the attachment of these feed-in pieces to the guide rails alone, and therefore only indirectly to the frame, causes twisting as a result of the forces acting on the guide tube and the drive chain when the fabric sheet is moved. According to the invention it is therefore arranged that the feed-in pieces are also attached to the frame by means of a second means of fastening. In this way, through an appropriate design of the second means of fastening, it is made possible for the feed-in pieces to reliably retain the spacing created during assembly, and therefore to ensure the proper functioning of the roller assembly.

For fixing to the frame at least one elongated hole extending in the transverse direction is favourably provided on the feed-in piece or on the frame as part of the second means of fixing, through which the variable attachment of the feed-in piece to the frame is enabled. It is particularly advantageous if, in order to secure against twisting, in other words to prevent an unwanted movement of the feed-in piece about an axis that is essentially orthogonal to the fabric sheet, the second means of fixing incorporates form-locking cooperating means of fastening on the feed-in piece and on the frame which engage with one another when the feed-in piece is in an assembled condition. This form-locking fastening favourably comprises engaging ribs.

In this way the remaining risk associated with the elongated holes, namely that the feed-in piece fastened by them becomes twisted, is significantly reduced. The mutual engagement of the said engaging ribs, which are favourably aligned in the longitudinal direction, prevents rotation of the feed-in piece with respect to the frame. An additional screwed fastening that is favourably provided prevents the engaging ribs at the feed-in piece and at the frame from becoming disengaged.

The invention, furthermore, relates to a vehicle with a roller assembly, whereby the roller assembly is constructed in the manner described above.

BRIEF DESCRIPTION OF THE DRAWINGS

Additional advantages and aspects of the invention emerge not only from the claims but also from the description below of a preferred embodiment of the invention, which is explained in more detail with the aid of the figures.

FIGS. 3a and 3b show the extension of the base assembly with the particular components for the roller assembly that are to be attached variably and FIGS. 4a to 6b show the positioning of the components that can be attached variably on the base assembly.

DETAILED DESCRIPTION

Figure 1:
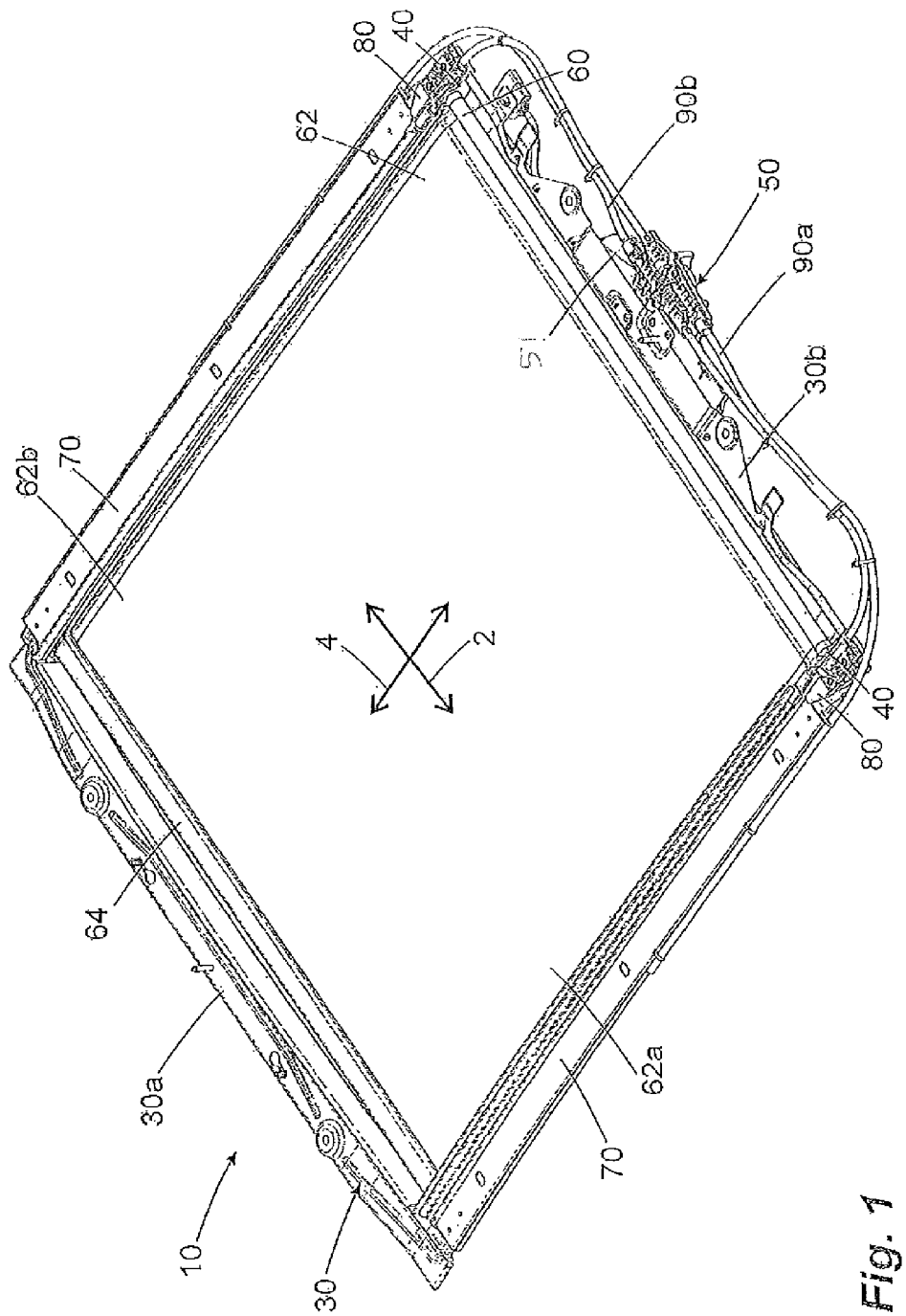
FIG. 1 shows a roller assembly according to the invention in an assembled state.
Figure 1A:
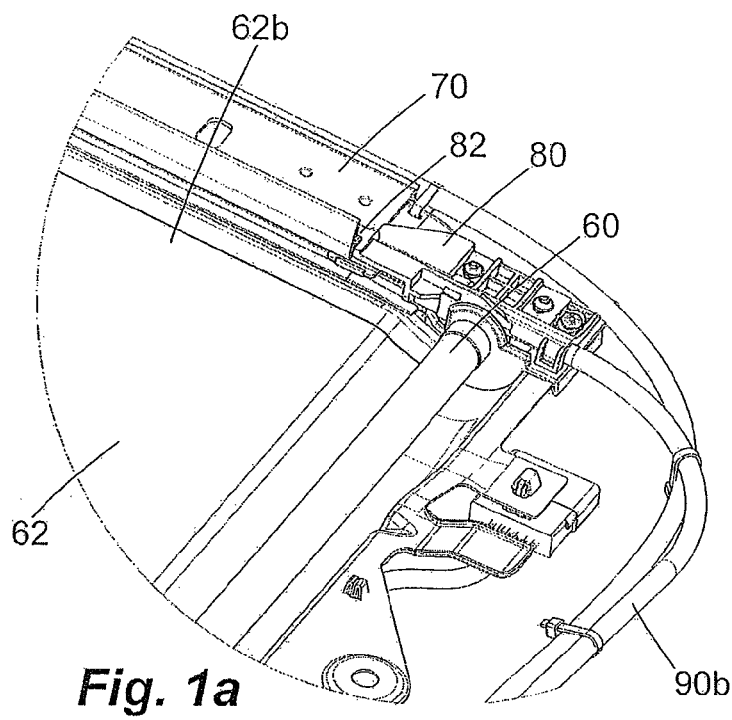
FIGS. 1a and 1b show details of the assembled roller assembly according to FIG. 1, FIGS. 2, 2a and 2b show a base assembly of the roller assembly with a part of the frame, a drive unit and a winding shaft, as well as detailed illustrations of these.
Figure 1B:
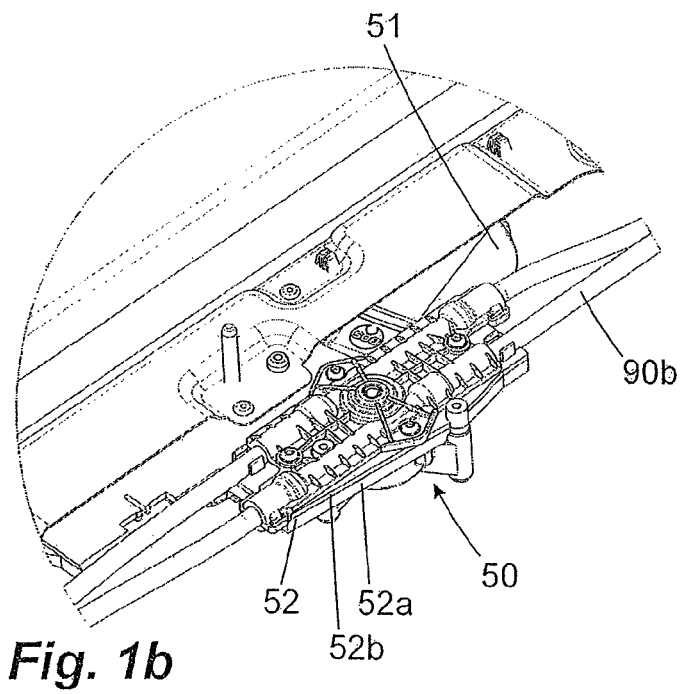

FIGS. 1, 1a and 1b show a roller assembly 10 according to the invention. In this case its purpose is to give shade, and for this reason is designed to be fitted to the glass roof of a vehicle. Roller assemblies of comparable designs can, however, also be employed in vehicles for other purposes, such as covers for freight compartments.

The roller assembly 10 according to the invention has a frame 30 with two cross-members 30a, 30b extending transversely to the vehicle. At the outer end of each, guide rails 70 extending in the longitudinal direction of the vehicle 4 are attached to the cross-members 30a, 30b. In addition, bearing blocks 40 are provided on the cross-member 30b, by means of which a winding shaft 60 is mounted so that it can rotate about an axis of rotation extending in the transverse direction of the vehicle 2. The winding shaft 60 is provided to hold a fabric sheet 62 that can be pulled out in the longitudinal direction 4 along the guide rails. A pull-out rod 64 is provided at the more remote end of the fabric sheet 62 for this purpose. In addition, slip bands are attached to each of the side edges 62a, 62b of the fabric sheet which can be repositioned in the longitudinal direction 4 in a manner not illustrated in more detail through a correspondingly shaped recess in the guide rails 70. For the purpose of automated repositioning of the fabric sheet 62 between a stowed position in which the fabric sheet 62 is essentially completely wound up on the winding shaft 60 and the functioning position illustrated in FIG. 1 in which the fabric sheet 62 is, at least predominantly, unwound from the winding shaft 60, a drive unit 50 is provided and is mounted in a fixed location on the cross-member 30b. Tube pieces 90a, 90b that are in themselves rigid extend from this drive unit 50 to feed-in pieces 80 which are attached to what from the point of view of the perspective shown in FIG. 1 are the right hand ends of the guide rails 70, and which are to remain in a fixed location with respect to these, regardless of their spacing.

By supplying power to an electric motor 51 of the drive unit 50, it is possible to reposition drive chains, not illustrated in FIG. 1, that run inside the tube segments 90a, 90b along the direction of their extension, and thus to push them into or to pull them out from the guide rails 70. These drive chains are coupled to the pull-out rod 64, so that this repositioning of the drive chains in the guide rails also results in a repositioning of the pull-out rod 64, and therefore in an unwinding or winding up of the fabric sheet 62 off or onto the winding shaft 60. Drive chains 90c, 90d located within the respective tube segments 90a, 90b are illustrated in dotted lines in FIG. 3a.

Because the fabric sheet 62 is subject to slight variations in its material properties or in its cut size, which can lead to a risk that the fabric sheet 62 will sag if the spacing of the guide rails 70 is always identical for all roller assemblies of the same type, the guide rails 70 can be attached to the frame 30a, 30b with a variable relative spacing in the transverse direction 2. In this way, in spite of varying material properties and/or cut size of the fabric sheet 62, a consistent appearance can be achieved on various roller assemblies of the same type.

The variable spacing in the transverse direction 2 is not restricted to the guide rails 70, but also affects the feed-in pieces 80 and the tube segments 90a, 90b that are provided on the guide rails 70.

As can be seen with the help of FIG. 1a, the feed-in pieces 80, which are favourably made of plastic, are immediately adjacent to the guide rails 70, which themselves are favourably of metal and favourably fabricated as extruded sections. Means of connection 82 are provided here, by means of which this connection between the feed-in pieces 80 and the guide rails 70 is achieved. In the present embodiment, this means of connection consists of push-in pieces 82 on the feed-in pieces 80, whose shape is matched to the sectional shape of the guide rails 70, and which thereby create a form-locking coupling in the transverse direction between the feed-in pieces 80 and the guide rails 70.

As is shown in FIG. 1b, the tube pieces 90a, 90b extend from these feed-in pieces 80 to the drive unit 50, where they are inserted into a housing 52 consisting of two half-shells 52a, 52b of the drive unit 50.

The way in which the roller assembly is designed to permit easy adaption of the positioning of the components that are affected by the variable spacing of the guide rails 70 is explained with the help of the following figures.

FIGS. 2, 2a, 2b illustrate a base assembly, comprising the cross-member 30b, the drive unit 50 and the bearing blocks 40 that are provided on the cross-member 30b. The relative positioning of these components is unchanging, and is not adjusted in response to the variability of the fabric sheet 62. As is shown in FIG. 2a, tube receptacles 54 are nevertheless provided on the housing 52 of the drive unit 50, serving to accept the tube sections 90a, 90b, each of them having a large number of grooves 54a around their perimeter and aligned transversely to the direction of their extension. In this way, in a manner still to be described below, the positioning of the tube sections 90a, 90b can be first adjusted and then fixed.

In order to fix the feed-in pieces 80 at a variable distance, two holes 42 are provided at each of the bearing blocks 40 to accept fixing screws. In addition, locking ladders with locking lugs 46 that extend in the longitudinal direction 4 and that are parallel to one another are provided on the top of the bearing blocks 40.

Starting from the base assembly illustrated in FIG. 2, in the course of the assembly of each guide rail 70, a sub-assembly consisting of the feed-in piece 80 and the tube section 90a or 90b that has already been connected to it is first provisionally attached. As is shown in FIG. 3a, each tube section 90a, 90b, which has a widened region 92 at the end that faces towards the drive unit 50, is placed within the lower half-shell 52a of the housing 52 of the drive unit 50. At the same time the corresponding feed-in piece 80 is positioned on the relevant bearing block 40, so that elongated holes 84 provided on the feed-in piece 80 line up with the holes 42 on the bearing block 40. This is illustrated in FIG. 3b.

As soon as this has been done, the individual adjustment of the roller assembly 10 is carried out. Hereby the guide rails 70, not illustrated in FIG. 3b, are set at such a distance in the transverse direction 2 that the fabric sheet 62 adopts the desired degree of sag when unwound from the winding shaft 60. After this the guide rails 70 are fastened at the appropriate distance in the frame 30a, 30b. The spacing of the guide rails 70 is also associated with a spacing of the feed-in pieces 80 with the feed-in regions 88a, 88b that are provided on them for the drive chain and the slip band, whereby the feed-in regions 88a, 88b have a form-locking connection to the guide rails 70 in the transverse direction 2 through the means of connection 82. Because, however, the direct connection between the feed-in pieces 80 and the guide rails 70 would in operation be inadequate for permanently maintaining the desired positioning of the feed-in piece 80, and because therefore malfunctions would have to be feared, the feed-in pieces 80 are additionally secured to the bearing blocks 40. This is done in that the feed-in pieces 80 corresponding to the guide rails 70 are pushed in the transverse direction, whereby a set of teeth 86 provided on the bottom of each of the feed-in pieces 80 is positioned in one of many possible locations against the corresponding teeth 46 of the bearing block 40. FIGS. 4*a* and 4*b* clarify this positioning, in which the feed-in pieces 80 as well as the guide rails 70 are fastened in an adjusted position to the frame 30 as soon as the fabric sheet 62 has the desired tension. For this purpose screws (see FIG. 1) are screwed through the elongated holes 84 of the feed-in pieces 80 and into the holes 42 of the bearing blocks 40, as a result of which the relative position between the feed-in pieces 80 and the bearing blocks 40 is permanently fixed. It may be true that under the appropriate circumstances, this screwed connection could itself be sufficient without the said sets of teeth 46, 86 to ensure that the position of the feed-in pieces 80 is fixed. The additional sets of teeth 46, 86 however provide particularly high assurance that the feed-in piece 80 will not be twisted about a vertical axis as a result of being subjected to force when the pull-out rod 64 is driven by the cord that is guided in the tube sections 90*a*, 90*b*.

Figure 5A:
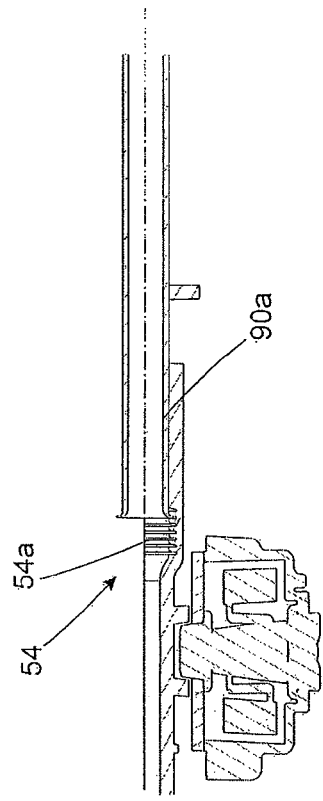
Figure 5B:
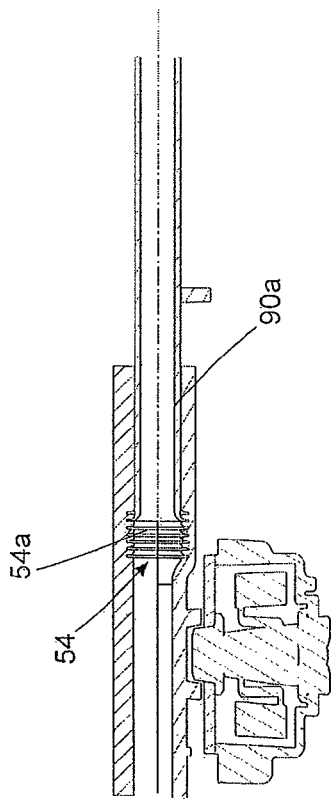

During the positioning of the feed-in pieces with respect to the bearing blocks 40, the oppositely positioned inside ends of the tube sections 90*a*, 90*b* with the widened regions 92 that have been provided are not yet permanently fixed to the housing 52 of the drive unit 50. It is therefore still possible to reposition the widened region 92 with respect to the grooves 54*a*, each spaced about 2 mm apart, of the tube receptacle 54. As soon as the feed-in pieces 80 have reached their final position, it is however possible to select the appropriate groove 54*a* for the particular individual case, and to insert the widened region 92 at the inward facing end of the tube section 90*a*, 90*b* into this groove. FIGS. 5*a* and 5*b* clarify this.

Figure 6A:
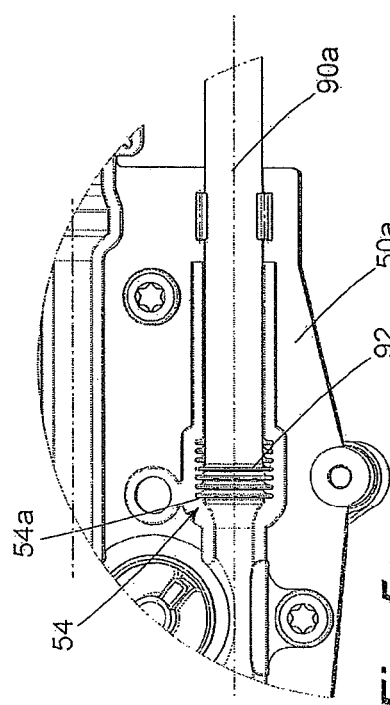
Figure 6B:
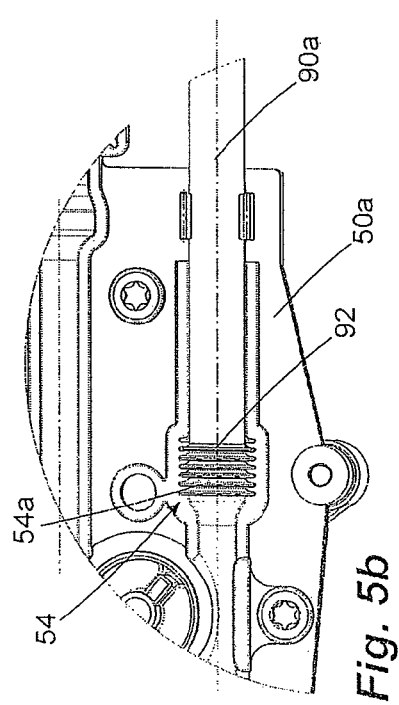

As soon as this has been done, the housing 52 of the drive unit 50 is closed in the manner illustrated in FIGS. 6*a* and 6*b*, so that the end of the tube section 90*a* or 90*b* that faces towards the drive unit is permanently secured in the particular appropriate position by the grooves around the perimeter of the housing sections 50*a*, 50*b*.

The roller assembly according to the invention thus allows adjustment of the spacing of its guide rails, and in particular realisation of the subsequent adjustments required for proper operation in terms of the guide tubes and the feed-in pieces in a particularly simple manner. This avoids difficulties during assembly.

The invention claimed is:

1. A roller assembly for a motor vehicle comprising:
   a rotatably supported winding shaft,
   a flexible fabric sheet which is wound up on the winding shaft when in a stowed condition and which is unwound in a longitudinal direction in order to reach a functioning position in which the fabric sheet is at least partially extended, and which fabric sheet incorporates sliding elements along side edges thereof,
   two guide rails extending in the longitudinal direction to guide the sliding elements provided on the side edges of the fabric sheet,
   a frame, whereby the guide rails are fastened on the frame at a desired but variable transverse spacing from one another,
   a rigid guide tube for a drive chain guided within the guide tube, the guide tube running from the frame to one of the guide rails or to a feed-in piece that is in a fixed position in relation to the one guide rail, the guide tube having a frame end including a cross-section different from a cross-section of the guide tube adjacent the frame end, and
   a fixing device configured to fix the frame end of the guide tube in relation to the frame, the fixing device including a tube receptacle for the guide tube provided on the frame, the tube receptacle having a multiplicity of sections spaced apart from one another in a direction transverse to the longitudinal direction, each section having a shape that matches the cross-section of the frame end of the guide tube, the frame end of the guide tube being engaged in a selected one of the sections to fix the frame end in relation to the frame in one of a plurality of discrete and predefined positions with respect to the transverse direction.

2. The roller assembly according to claim 1, wherein a drive unit is provided on the frame, the drive unit being operatively connected to the drive chain to cause translative movement thereof, the drive chain extending from the drive unit to the one guide rail and moving the fabric sheet from the stowed condition into the functioning position, whereby the guide tube extends from the drive unit to the one guide rail or to the feed-in piece that is in a fixed position with respect to the one guide rail, and whereby the fixing device is fabricated on the drive unit.

3. A vehicle with a roller blind, wherein the vehicle incorporates a roller assembly according to claim 1.

4. The roller assembly according to claim 1, wherein the tube receptacle incorporates two half-shells configured to accept the frame end of the guide tube, whereby the half-shells surround a perimeter of the guide tube when assembled to the frame, and whereby the sections are provided on one or both of the two half-shells.

5. The roller assembly according to claim 4, wherein the half-shells or housing parts on which the half-shells are provided incorporate a snap-in connection of the half-shells to one another that cannot be released without tools.

6. A roller assembly for a motor vehicle comprising:
   a rotatably supported winding shaft,
   a flexible fabric sheet which is wound up on the winding shaft when in a stowed condition and which is unwound in a longitudinal direction in order to reach a functioning position in which the fabric sheet is at least partially extended, and which fabric sheet incorporates sliding elements along its side edges thereof,
   two guide rails extending in the longitudinal direction to guide the sliding elements provided on the side edges of the fabric sheet,
   a frame, whereby the guide rails are fastened on the frame at a desired but variable transverse spacing from one another,
   a feed-in piece corresponding to each of the guide rails and being a separate component therefrom, whereby the feed-in pieces each have a feed-in opening for the respective sliding element or a feed-in opening for a drive chain, whereby the feed-in pieces are joined to the respective guide rails such that the feed-in pieces adopt a variable transverse spacing from one another jointly with the respective guide rails, and whereby a cooperating fixing arrangement is provided at each feed-in piece and on the frame allowing fixing of the respective feed-in pieces in a variable position on the frame and providing security against twisting of the feed-in pieces with respect to the frame.

7. The roller assembly according to claim 6, wherein each fixing arrangement incorporates elongated holes at the feed-in piece or on the frame.

8. The roller assembly according to claim 6, wherein each fixing arrangement incorporates engaging ribs extending in the longitudinal direction along the respective feed-in piece with which corresponding engaging ribs of the frame that extend in the longitudinal direction engage.

9. A vehicle with a roller blind, wherein the vehicle incorporates a roller assembly according to claim 6.

10. A roller assembly for a motor vehicle comprising:
a frame;
a winding shaft rotatably supported on said frame;
a flexible fabric sheet having a stowed position wherein said flexible fabric sheet is wound up on said winding shaft and a functional position wherein said flexible fabric sheet is unwound and at least partially extended in a longitudinal direction from said winding shaft, said flexible fabric sheet having a pair of laterally spaced and longitudinally extending side edges and respective sliding elements provided along the respective side edges;
a pair of laterally spaced guide rails extending in the longitudinal direction, said sliding elements of said flexible fabric sheet being guided by the respective guide rails during movement of said flexible fabric sheet between the stowed and functional positions, said guide rails being fastened to said frame at a predetermined distance from one another as measured in a direction transverse to the longitudinal direction; and
a feed-in piece attached to each of said guide rails, said feed-in pieces being laterally spaced from one another at the predetermined distance defined transversely between said guide rails, each said feed-in piece being attached to said frame by a fastening arrangement configured to permit adjustment of the position of the respective said feed-in piece relative to said frame in the transverse direction, said fastening arrangement also being configured to prevent twisting of the respective said feed-in piece relative to said frame.

11. The roller assembly according to claim 10, further including a pair of drive chains operatively connected to said flexible fabric sheet to move said flexible fabric sheet between the stowed and functional positions, a pair of rigid guide tubes each extending from said frame to one of said guide rails, said drive chains being disposed within the respective said guide tubes, and said feed-in pieces being disposed between ends of the corresponding said guide rails and the corresponding said guide tubes.

12. The roller assembly according to claim 10, wherein each said fastening arrangement includes at least one opening which is elongated in the longitudinal direction and disposed in one of: the respective said feed-in piece; and said frame adjacent the respective said feed-in piece, said opening being vertically aligned with an opening disposed in the other of said feed-in piece and said frame, said openings receiving therein a fastener extending into said feed-in piece and said frame.

13. The roller assembly according to claim 12, wherein each said fastening arrangement includes a first plurality of teeth extending in the longitudinal direction along the respective said feed-in piece and a second plurality of teeth extending in the longitudinal direction along said frame, said first plurality of teeth engaging with said second plurality of teeth to prevent twisting of the respective said feed-in piece relative to said frame.

14. A roller assembly for a motor vehicle comprising:
a frame;
a winding shaft rotatably supported on said frame;
a flexible fabric sheet having a stowed position wherein said flexible fabric sheet is wound up on said winding shaft and a functional position wherein said flexible fabric sheet is unwound and at least partially extended in a longitudinal direction from said winding shaft, said flexible fabric sheet having a pair of laterally spaced and longitudinally extending side edges and respective sliding elements provided along the respective side edges;
a pair of laterally spaced guide rails extending in the longitudinal direction, said sliding elements of said flexible fabric sheet being guided by the respective guide rails during movement of said flexible fabric sheet between the stowed and functional positions, said guide rails being fastened to said frame at a predetermined distance from one another as measured in a direction transverse to the longitudinal direction;
a drive chain operatively connected to said flexible fabric sheet to move said flexible fabric sheet between the stowed and functional positions;
a rigid guide tube extending from said frame to one of said guide rails, said drive chain being disposed within said guide tube, said guide tube having a portion spaced from said one guide rail; and
a fixing device disposed on said frame, said fixing device being configured to attach said portion of said guide tube to said frame, said fixing device including a housing, said housing defining a plurality of grooves spaced apart from one another in the transverse direction, and said portion of said guide tube being shaped to engage within a selected one of said grooves to allow selective positioning of said guide tube relative to said frame in the transverse direction in one of a plurality of discrete and predetermined positions.

15. A roller assembly for a motor vehicle comprising:
a frame;
a winding shaft rotatably supported on said frame;
a flexible fabric sheet having a stowed position wherein said flexible fabric sheet is wound up on said winding shaft and a functional position wherein said flexible fabric sheet is unwound and at least partially extended in a longitudinal direction from said winding shaft, said flexible fabric sheet having a pair of laterally spaced and longitudinally extending side edges and respective sliding elements provided along the respective side edges;
a pair of laterally spaced guide rails extending in the longitudinal direction, said sliding elements of said flexible fabric sheet being guided by the respective guide rails during movement of said flexible fabric sheet between the stowed and functional positions, said guide rails being fastened to said frame at a predetermined distance from one another as measured in a direction transverse to the longitudinal direction;
a drive chain operatively connected to said flexible fabric sheet to move said flexible fabric sheet between the stowed and functional positions;
a rigid guide tube extending from said frame to one of said guide rails, said drive chain being disposed within said guide tube, said guide tube having a portion spaced from said one guide rail;

a fixing device disposed on said frame, said fixing device being configured to attach said portion of said guide tube to said frame; and a drive unit mounted on said frame and connected to said drive chain such that actuation of said drive unit causes movement of said drive chain within said guide tube to effect movement of said flexible fabric sheet between the stowed and functional positions, said drive unit including a housing comprising said fixing device, said fixing device including a receptacle defined in said housing and having a plurality of grooves spaced apart from one another in the transverse direction, said portion of said guide tube being shaped to engage within a selected one of said grooves to allow selective positioning of said guide tube relative to said frame in the transverse direction in one of a plurality of discrete and predetermined positions.

* * * * *